(No Model.) 5 Sheets—Sheet 1.

P., J. & P. W. SOMMER.
MACHINE FOR MAKING WIRE FENCING.

No. 490,775. Patented Jan. 31, 1893.

Witnesses:
Chas. E. Raabe
R. N. McCormick

Inventors:
Peter Sommer
John Sommer
Peter W. Sommer
by W. V. Tifft Atty.

(No Model.) 5 Sheets—Sheet 2.
P., J. & P. W. SOMMER.
MACHINE FOR MAKING WIRE FENCING.
No. 490,775. Patented Jan. 31, 1893.
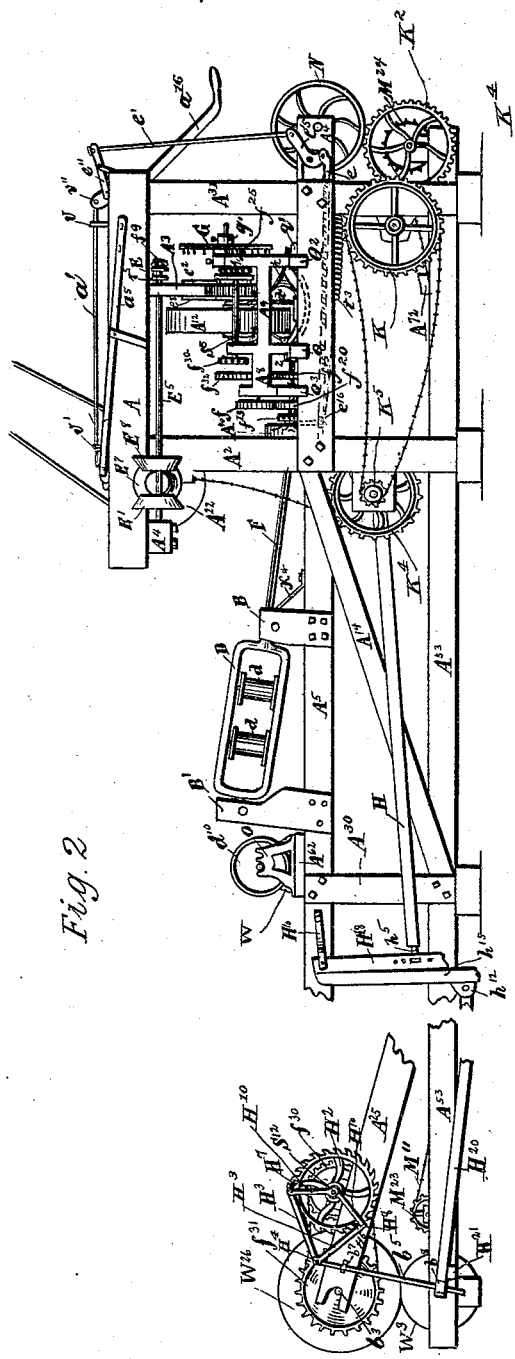
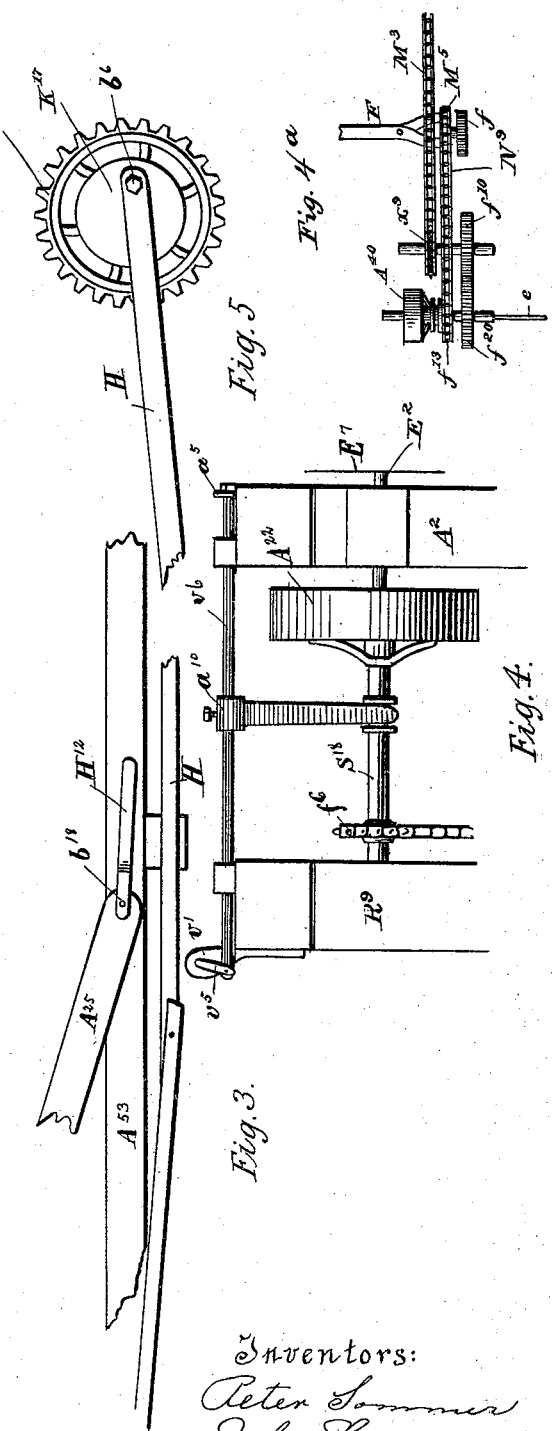

(No Model.) 5 Sheets—Sheet 3.

P., J. & P. W. SOMMER.
MACHINE FOR MAKING WIRE FENCING.

No. 490,775. Patented Jan. 31, 1893.

Witnesses.
Chas. E. Raabe
R. N. McCormick

Inventors:
Peter Sommer
John Sommer
Peter W. Sommer
by W. V. Tefft, Atty.

(No Model.)  5 Sheets—Sheet 4.
P., J. & P. W. SOMMER.
MACHINE FOR MAKING WIRE FENCING.
No. 490,775.  Patented Jan. 31, 1893.
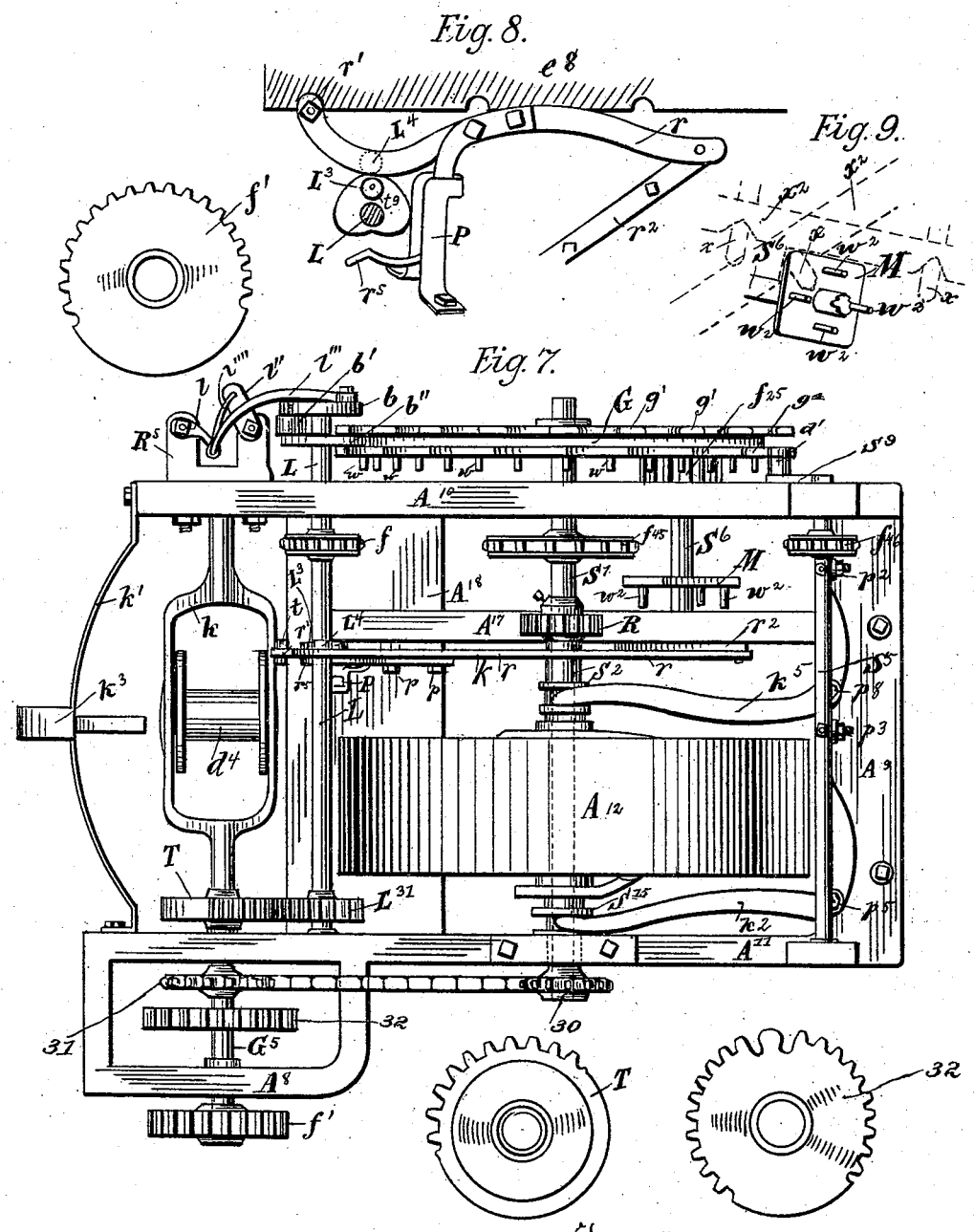

(No Model.) 5 Sheets—Sheet 5.
P., J. & P. W. SOMMER.
MACHINE FOR MAKING WIRE FENCING.
No. 490,775. Patented Jan. 31, 1893.
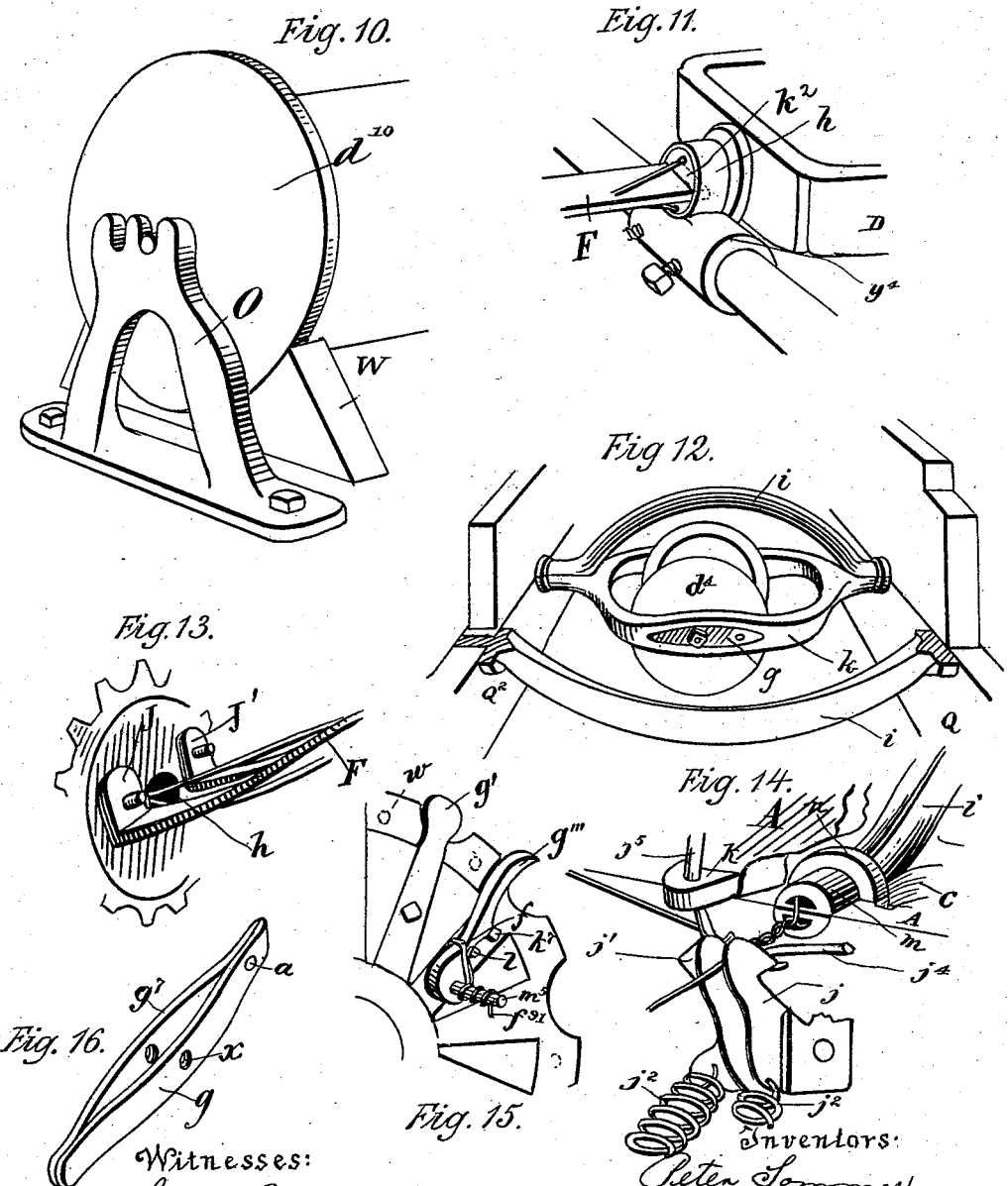

UNITED STATES PATENT OFFICE.

PETER SOMMER, JOHN SOMMER, AND PETER W. SOMMER, OF TREMONT, ILLINOIS.

MACHINE FOR MAKING WIRE FENCING.

SPECIFICATION forming part of Letters Patent No. 490,775, dated January 31, 1893.

Application filed September 10, 1891. Serial No. 405,353. (No model.)

*To all whom it may concern:*

Be it known that we, PETER SOMMER, JOHN SOMMER, and PETER W. SOMMER, citizens of the United States, residing at Tremont, in the county of Tazewell and State of Illinois, have invented certain new and useful Improvements in Machines for Making Wire Fence; and we do hereby declare that the following is a full, clear, and exact description of the invention, which will enable others skilled in the art to which it appertains to make and use the same.

Our invention relates to certain new and useful improvements in wire fence making machines by means of which a machine is provided being complete and efficient in its working.

More particularly our invention relates to that class of wire fence making machines which are purposed to use wire alone in the manufacture of the fence and to produce what is commonly called a woven wire fence, which consists essentially of a series of frame wires upon which is twisted a continuous wire to form short cables at the intersecting points and at substantially right angles with the frame wire and weaving it into forms which may be designated as key-stone meshes and may be operated by any suitable power.

Figure 1:
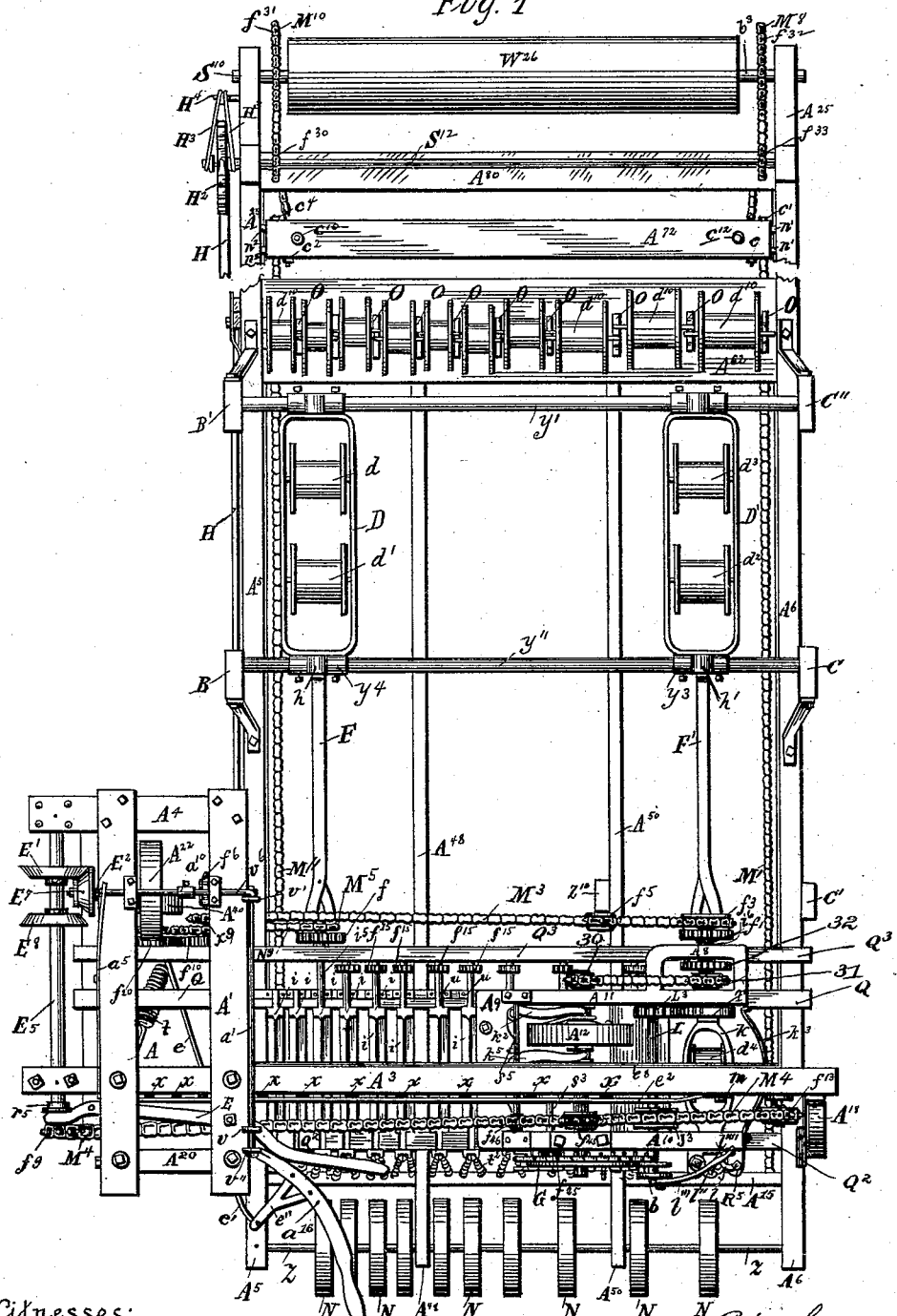
Figure 6:
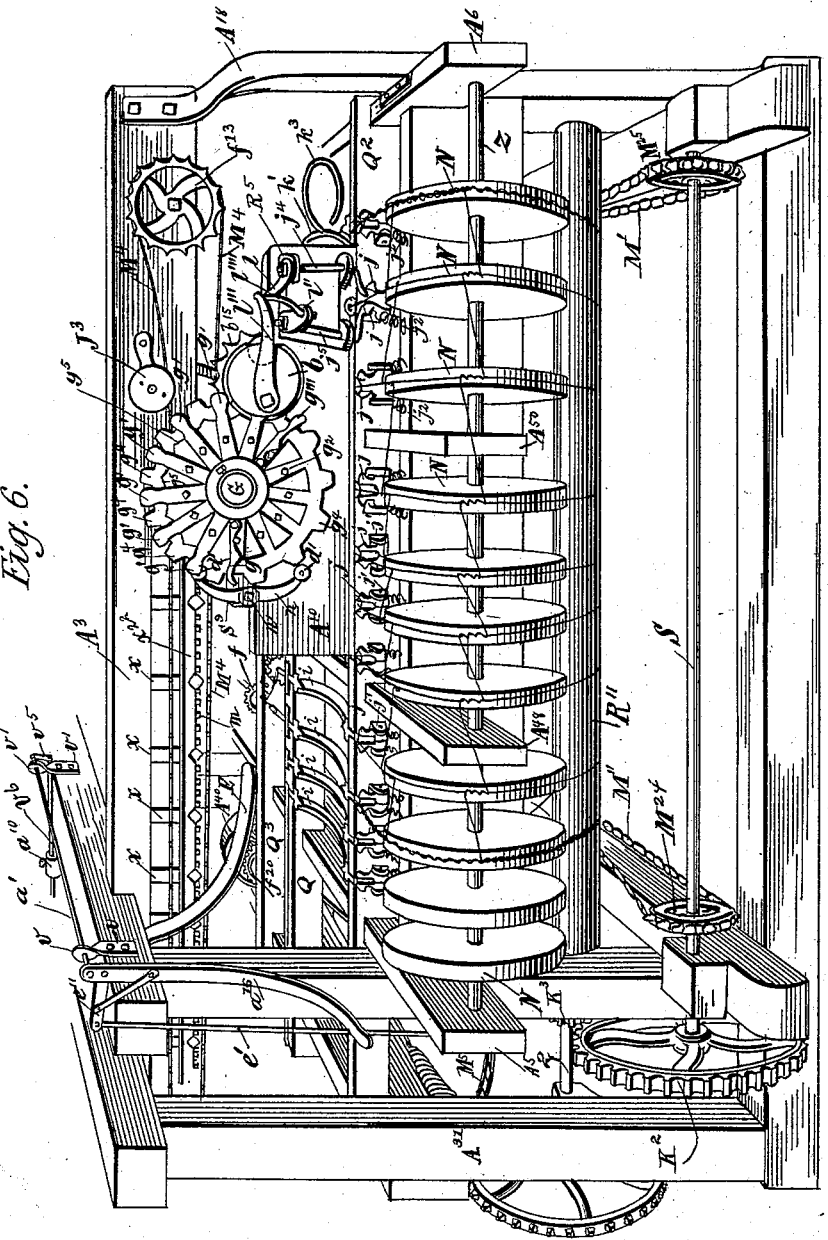

That our invention may be more fully understood, reference is had to the accompanying drawings in which:

Figure 1 is a plan view of our improved wire fence making machine. Fig. 2 is a side elevation of the machine. Fig. 3 is a detail view of a portion of the framework showing the pivotal attachment of a lever thereto. Fig. 4 is a detail view of a friction clutch, showing the means of operating the same. Fig. 4$^a$ is a detail view of certain gearing. Fig. 5 is a detail view of combined sprocket wheel and eccentric. Fig. 6 is a front elevation in perspective of the machine. Fig. 7 is a detail view showing a carriage which is designed to bear and travel upon the frame construction. Fig. 8 is a detail view showing the means of securing the carriage in position, and Fig. 9 is also a detail view showing an auxiliary means for holding the carriage in a fixed position. Fig. 10 is a detail view showing the adjustment of spools upon friction blocks. Fig. 11 is a detail view showing the means of carrying wires through a spool frame and also the forward support of the said spool frame. Fig. 12 is a detail view showing the combination of two independent sections which are designed to be revolved together. Fig. 13 is a detail view showing the connection between a sprocket wheel, which is designed to be carried upon the end of a hollow casting, and certain bars that connect at the opposite extremity with a frame that carries spools, and also shows the manner in which wires are carried to enter the hollow casting. Fig. 14 is a detail view showing the relative adjustment of operative parts in making a twist of wires. Fig. 15 is a detail view of a portion of a disk-wheel, showing the location of certain parts. Fig. 16 is a detail view of a spring to tension the woof-wire spool.

In Fig. 1, $A^5$ and $A^6$ are horizontal side frame pieces; A, A′, $A^{20}$, $A^3$, and $A^4$ are also portions of the frame construction; $A^2$, $A^{31}$, $A^{18}$, B, B′, C, C′, and C″ are perpendicular frame pieces to which the longitudinal frame pieces are attached; $A^{30}$, $A^{62}$ and $A^{15}$ are cross frame pieces; Q, $Q^2$, and $Q^3$ are cross pieces, which form a bearing for the carriage, the general frame work of which is composed of the parts $A^8$, $A^9$, $A^{10}$, $A^{11}$, $A^{17}$, and $A^{18}$; N, N, N &c. is a series of wheels keyed upon the shaft Z, the same being journaled in the frame pieces $A^5$ and $A^6$, which said wheels are adjusted at different distances apart to align with the semi-circular castings $i$, $i$, $i$ &c., the said castings being journaled in open boxes at their forward ends in the frame piece $Q^2$ and at their backward extremities in open boxes in the frame piece Q, and are further carried in sockets or boxes in the frame piece $Q^3$, the said semi-circular castings bearing on their backward ends the cog wheels $f^{15}$, $f^{15}$, $f^{15}$ &c. The wheels N, N, N &c. are designed to carry wires upon their surfaces and the semi-circular castings (a detailed view of which is shown in Fig. 12) are provided with a perforation in the half journals of their forward ends through which wires are carried, as best seen in Fig. 14, the same continuing on beneath the castings and are carried on through perforations or hollow ends of the said castings; two of the said castings have backward extensions which are designed to carry the segmental cog wheels $f, f'$ keyed thereon, the same being designed to carry double wires which together with a crossing wire which is designed to be twisted with it to form the cables at the sides of the woven fabric; $M^5$ and $f^3$ are sprocket wheels connected with the castings designed to carry cable wires, and F and F' are bars connected with the sprocket wheels and branched at their forward ends (as shown in Fig. 13) and connected with said sprocket wheels by means of pins on said sprocket wheels carried in perforations in the branched arms J, J' of the said bars; D, D' are frames, in which respective frames are carried the spools $d$, $d'$ and $d^2$, $d^3$, the said frames D, D' being carried in suitable boxes at their forward and backward ends, which said boxes are carried upon the bars $y'$, $y''$ (a detailed view of the forward part of the frames is shown in Fig. 11) in which said figure the bar F is shown carried in a slot in the end of the solid journal connected with the frame which carries the spools with perforations in said journal above and below the slot which carries the bar and it also shows the manner in which the box is carried upon the shaft; $d^{10}$, $d^{10}$, $d^{10}$ &c. are spools carried in the standards O, O, O &c. (the same being best shown in Fig. 10) and which said figure also shows a friction block W upon which the rim of the said spool bears, a friction block being provided for each spool throughout the series; $A^{72}$ (as shown in Fig. 1) is the upper section of a clamp, designed to secure the wire fence after it has been woven and to draw it out, which drawing out is accomplished by means of the sprocket chains M' and M'' connected therewith and by other means hereinafter to be more fully described. $W^{26}$ is a roller carried upon the shaft $b^3$, the same being journaled in the frame pieces $A^{25}$, $A^{25}$; $S^{12}$ is a shaft journaled in the said side pieces $A^{25}$ carrying the sprocket wheels $f^{30}$ and $f^{33}$ keyed thereon, which are connected with the sprocket wheels $f^{31}$ and $f^{32}$ upon the shaft $b^3$ by means of the sprocket chains $M^8$ and $M^{10}$.

In Fig. 2 the detailed construction of the rear portion of the machine is best shown, in which said figure, $W^3$ is a roller journaled in the frame piece $A^{53}$ and in the corresponding frame piece on the opposite side, the said frame pieces being the lower and main longitudinal frame pieces of the machine. On the end of the shaft $S^{12}$ is keyed a ratchet wheel $H^2$ and journaled on either side of said ratchet wheel are short arms $H^{10}$, two on either side of the said ratchet wheel which radiating outward are pivotally connected with corresponding arms $H^3$ at the outer edge of the ratchet wheel, there being two on either side and carrying upon the pivotal connections the pawls $H^7$ and $H^8$, the said arms extending backward are all pivoted together with the depending lever $b^5$, as at $H^4$, the same depending through a slot in the backward end of the arm $H^{20}$ and is pivoted to the frame piece $A^{25}$ as at $b^7$.

In Fig. 1, $E^5$ is a slip shaft journaled in the frame pieces $A^3$, $A^4$, and having fixed thereon the sprocket wheel $f^9$, the collar $r^5$ and the beveled wheels E' and $E^3$.

$E^2$ is a shaft journaled in perpendicular frame pieces $A^2$, $R^9$ (Fig. 4) and having secured thereto the friction wheel $E^7$ and the friction clutch wheel $A^{22}$ and bearing also a hollow shaft to which is attached the sprocket wheel $f^6$. $M^4$ is a sprocket chain running upon and connected with the sprocket wheels $f^{13}$, $f^{19}$ (shown in Figs. 1 and 6) and the said sprocket chain $M^4$ is carried also upon sprocket wheels $f^{45}$, $f^{46}$ and the belt tightener $J^3$ (the operation and use of these various sprocket wheels will be more fully described in connection with the description of Fig. 7). E is a lever pivoted to the underside of the frame piece A' and is provided at its outward end with suitable fingers which are carried between the rims of the collar $r^5$ and the object of the said lever and its use is to operate the shifting shaft $E^5$ by a backward or forward movement with a view of alternately contacting the beveled wheels E', $E^3$ with the beveled friction wheel $E^7$ which produces an alternate direction of rotation of the shaft $E^5$ as is necessary to run the sprocket chain $M^4$ alternately in opposite directions; $a^{16}$ is a lever to which is attached the rod $a'$, the same being journaled in suitable boxes and provided at its backward end with the short depending arm $v^5$ (best shown in Fig. 4) which connects with the shift rod $v^6$, which said shift rod is attached to the spring $a^5$ at its outer end and which carries fixed thereon the depending arm $a^{10}$ which connects by means of fingers with a collar on the hollow shaft $S^{18}$ which bears the sprocket wheel $f^6$ and clutch attachment, the combination being designed to operate the friction clutch wheel $A^{22}$. To the lever $a^{16}$ is attached the projecting arm $e''$, the same connecting with the depending rod $e'$ as will be best seen by reference to Fig. 2 and in this figure the depending rod $e'$ is pivotally connected with the pivoted lever $e^{15}$, and to the short arm of the lever $e^{15}$ is pivotally connected the rod $e$, the same bearing backward carries fixed thereto the arm $e^{16}$ which is connected by means of fingers with the collar on a hollow shaft which bears the sprocket wheel $f^{13}$ and clutch attachment (Fig. 4ᵃ) and is designed to engage or release the friction clutch wheel $A^{40}$; $t^3$ is a spring attached to the rod $e$, and designed to release the friction clutch when not desired to be operated; and the other combination just described is designed to operate the said friction clutch, for engagement with wheel $A^{40}$. K, $K^5$ are sprocket wheels connected by means of a sprocket chain; and upon the same shaft with the sprocket wheel K (the said shaft being designated in Fig. 6 by 2) is the cog wheel $K^3$ which meshes with the cog wheel $K^2$, the same being upon the shaft S which also carries the sprocket wheels $M^{25}$ and $M^{24}$ keyed thereon, the said sprocket wheels $M^{24}$ and $M^{25}$ carrying the sprocket chains M' and M" which are carried upon the sprocket wheels at the rear end of the machine, one of which is designated by $M^{23}$ as shown in Fig. 2. In Fig. 2 the sprocket wheel $K^4$ is journaled upon the same shaft with the sprocket wheel $K^5$, the said sprocket wheel $K^4$ being provided with a pin at a point without its center to form an eccentric to which is attached the backwardly extending arm H, the said arm being connected with the spring lever $H^8$ which is pivoted to the frame piece $A^5$ and which said spring lever is completed by means of the depending arm $h^{15}$ to the lower portion of which is attached the extension arm $H^{20}$, the same bearing upon the lug $H^{21}$ and is provided with a perforation through which the depending lever $b^5$ bears loosely. The sprocket wheel $K^4$ is connected with the sprocket wheel $f^6$ (as shown in Figs. 1, 2, and 4) by means of a sprocket chain; $f^{10}$ and $f^{20}$ are cog wheels designed to mesh with each other, as shown in Fig. $4^a$, the cog wheel $f^{20}$ being keyed upon the same shaft with the wheel $A^{40}$, and the cog wheel $f^{10}$ being keyed upon the same shaft with the sprocket wheel $x^9$. $N^9$ is a sprocket chain connecting the sprocket wheel $M^5$ with the sprocket wheel $f^{13}$ (shown in Fig. 2). $M^3$ is a sprocket chain connecting the sprocket wheel $x^9$ with the sprocket $f^3$; $f^5$ is a sprocket wheel designed as a support for the sprocket chain $M^3$.

In Fig. 6, R" is a roller upon which the wire netting bears and is designed only to give direction to and facilitate the drawing out of the wire fabric. To the frame piece $A^3$ are attached the depending fingers x, x, &c. and bearing over these depending fingers is the notched bar $x^2$ and on the lower surface of said frame piece $A^3$ is fixed the plate of cogs m, j, j, j, &c. is a series of fingers pivoted together in pairs in the castings J', and aligning with the wheels N, N, &c. and with the semicircular castings i, i, i &c. and having attached thereto the springs $j^2, j^2$, &c.

In Fig. 7 we have a detail view of a movable framework or carriage which is designed to bear and travel upon the frame pieces Q', $Q^2$, and $Q^3$ and is composed of the main frame parts $A^8$, $A^9$, $A^{10}$, $A^{11}$, $A^{17}$, and $A^{18}$ and within the frame pieces $A^{10}$ and $A^{11}$ we have journaled the main shaft S' upon which is loosely journaled the disk wheel G and having keyed thereon the sprocket wheel $f^{45}$. Upon the said shaft S', is the hollow shaft $S^2$ upon which said hollow shaft is fixed the cog wheel R. $A^{12}$ is a friction clutch wheel, the same being keyed upon the shaft S'. The said hollow shaft $S^2$ is provided with a suitable collar and clutch apparatus to engage the rim of the wheel $A^{12}$ as is also the hollow shaft $S^{15}$, which said shaft $S^{15}$ carries at its rear extremity the sprocket wheel $f^{30}$ fixed thereto; $k^2$, $k^5$ are levers being pivoted as at $p^5$, $p^8$ with the long arms thereof connecting by suitable fingers with the collars on the hollow shafts $S^2$, $S^{15}$, and the short arms of the said levers bearing slightly upward are fixed to the shaft $S^5$, as at $p^2$, $p^3$ and are designed to shift the friction clutches to engage or release the friction clutch wheel $A^{12}$ which is accomplished by a slight turn of the shaft $S^5$ which will be more fully described in connection with the operation of the machine; $f^{46}$ is a sprocket wheel loose upon the shaft $S^5$ upon the forward end of which said shaft $S^5$ are attached rigidly the fingers $S^9$ the same being best shown in connection with Fig. 6, in which said figure the fingers are shown fixed as at n' and bearing at their outward extremities the small pivoted rollers d'. $S^6$ is a shaft journaled in the frame pieces $A^{10}$, $A^{17}$ upon the forward end of which is keyed the cog wheel $f^{25}$ and also having fixed thereon the square plate M, being provided with pins as best shown in Fig. 9, in which said figure $S^6$ is the shaft, M, the square plate, and $w^2$, $w^2$, $w^2$, are pins fixed upon the square plate as shown in Fig. 9, the slightly rounded corners of said square plate being designed to fit within a notch or notches of the bar $x^2$ and the depending finger x is designed to contact with the pins $w^2$, $w^2$, $w^2$ &c. for the purpose of turning the square plate M which will be more fully described in connection with the operation of the machine. L is a shaft journaled in the frame pieces $A^{10}$, $A^{11}$ and having keyed thereto the segmental cog wheel $L^{31}$, a detailed detached view of which is shown below the main Fig. 7 and designated by the letter T, and to which said shaft L is also attached the cam wheel $L^3$, a detailed view of which is shown in Fig. 8 in connection with which is shown a device which it operates for the purpose of staying the carriage in the desired position. The device for staying the carriage consists essentially of a pivoted lever r branched at its forward end into two arms, one arm bearing upward and carrying a roller at its upward extremity which is designed to engage the openings or depressions in the plate $e^8$, the said upward extending arm being also provided with the pivoted roller $L^4$ which contacts with the cam wheel $L^3$ which said cam wheel in its rotation raises the lever to the desired height; the depending arm $r^5$ of the lever is purposed to contact with the small roller $t^9$, on the cam wheel in the rotation of the said wheel which is purposed by such contact to depress the said lever and with it the upwardly tending arm of the lever thus releasing it from the engagement with the depressions in the plate $e^8$. P represents a standard fixed upon the framework of the carriage and purposed to hold the lever in proper position; $r^2$ is a bar designed to be attached to the framework of the carriage and to which is pivotally attached the lever r. Upon the shaft L is loosely journaled the sprocket wheel f and upon the forward end of the said shaft are fixed the disk wheels b and b" between which said disk wheels and at their outward edge is carried the pivoted roller $b'$ which is purposed to engage the fingers $g'—g'—g'—$&c. The inner disk wheel $b''$ is purposed to engage slight depressions in the disk wheel G, the said disk wheel $b''$ being cut off or depressed at or near the point where the roller $b'$ contacts with the said disk to enable it to free itself from its engagement in the depressions before described in the disk wheel G. $G^5$ is a shaft journaled in the frame pieces $A^8$, $A^{11}$ having keyed thereon the segmental cog wheel $f'$ a detailed detached view of which is shown above Fig. 7, also the segmental cog wheel 32 (a detailed view of which is shown below the main Fig. 7) also the sprocket wheel 31, the same being connected with the sprocket wheel 30 by means of a sprocket chain, and said shaft $G^5$, also has fixed thereon the segmental cog wheel T, exactly similar to the segmental cog wheel $L^{31}$ with which it engages; the purpose of the said cog wheels and sprocket wheels will be more fully shown in connection with the description of the operation of the machine. $k$ is a frame work which carries the spool $d^4$ and having the forward ends journaled in semi-circular depressions in the lower surface of the frame pieces $A^{10}$ and $A^{11}$ which conform with the shape of the journal which it carries (the detailed construction of which is best shown in Figs. 12 and 14). To the front face of the frame piece $A^{10}$ is attached the casting $R^5$ which has forwardly projecting lugs (as best shown in Fig. 6) which carry through perforations depending pins $j^4$, $j^5$ which carry at their lower extremities short arms which are purposed to engage and press outward the fingers $j$ (as best shown in Fig. 14) and the said short arms are operated through and by means of the levers $l$, $l''''$, $l''$, and the connection $l'''$ with the disk wheel $b$ at a point without its center which forms an eccentric, the operation of which will be hereinafter more fully described. $k'$ is an iron frame piece to which is attached the spring $k^3$, which acts as a straightener or adjuster for the semi-circular castings to keep them in proper position that they may not interfere with the movement of the carriage in its passage back and forth.

In Fig. 12 is shown the detailed construction of the semi-circular casting $i$ and also its combination with the frame work which carries the spool. In this figure the casting $i$ is shown with its half journals bearing in semi-circular depressions in the lower frame work so that the flat surface of the half journals of the casting $i$ is flush with the upper surface of the frame piece in which it bears. The frame work which carries the spool is also provided with a half journal which is carried in the frame work of the carriage so that the carriage in its passage backward and forward stops immediately over the casting $i$ as it is arranged so as to stop over every casting of the series to form a complete journal and it is designed that they be rotated when in this position in manner shown in the said figure and the appearance of the complete journal thus formed, is best shown in Fig. 14 which also shows openings in each half journal for the passage through of wires which are designed to be twisted together.

In Fig. 16 is shown a spring which is designed to be carried in the frame work which bears the spool as shown in Fig. 12, and is designated by $g$, and is designed to contact with the spool to prevent its turning too freely, thus producing a tension of the wire being wound from the spool, and this may be regulated by means of a bolt and nut connection between the spring and spool.

In Fig. 6, G refers to a disk wheel made in several sections to form the notches and raised portions $g^4$, $g^4$ &c. and the circular depressions $g^5$, $g^5$ &c. and provided with the fingers $g'—g'$ &c. and the pins $w$ &c. (as shown in Fig. 7) and also provided with the pivoted fingers $g'''$, $g'''$, (best shown in detail in Fig. 15) in which said figure the pivoted finger $g'''$, is shown journaled on the pin $m^5$ and held down upon the lug $k$, by means of the spring $f^{91}$; the use and purpose of the several parts of the disk wheel G will be hereinafter more fully described in connection with the operation of the machine.

In operation the several parts of the machine having been first adjusted in their relative working positions, power is applied through and by means of a belt connection with the wheel $A^{22}$ which in its rotation rotates the shaft $E^2$ which in turn rotates the beveled friction pulley wheel $E^7$, which as shown in Fig. 1 contacting with the bevel wheel $E'$ rotates the same and with it the shaft $E^5$ (it will be understood that by contact of $E^7$ with $E^8$ the opposite rotation of shaft $E^5$ is had) upon which it is fixed, which imparts a corresponding rotary motion to the sprocket wheel $f^9$ which in turn imparts movement to the sprocket chain $M^4$, the said sprocket chain engaging the sprocket wheel $f^{45}$ and being held firmly upon the said sprocket wheel by means of the loosely journaled sprocket wheels $f$ and $f^{46}$ rotates the same and with it the shaft $S'$ upon which it is secured. As the wheel $A^{12}$ is also secured to the shaft $S'$ it is likewise rotated, and as before described it is designed to be engaged and released by the friction clutches alternately and at all times by one or the other of the said friction clutches to impart rotary motion to the hollow shafts $S^2$ and $S^{15}$ upon which is secured upon the hollow shaft $S^2$ the cog wheel R, which is designed to move the carriage and upon the hollow shaft $S^{15}$, the sprocket wheel 30, which by means of its sprocket chain connection with other working parts of the machine is designed to convey the requisite rotary motion to form the several twists. The shifting of the friction clutches is accomplished by means of the arms $k^5$ and $k^2$ which form the long arms of a lever, the same being pivoted as at $p^8$ and $p^5$, respectively, the long arms being provided with fingers at their forward extremities purposed to engage with and being carried in suitable collars on the hollow shafts $S^2$ and $S^{15}$, and the short arms of the said levers bearing forward and upward are secured to the shaft $S^5$ as at $p^2$, $p^3$ which said shaft bears at its forward end the semi-circular piece $S^9$ (best shown in Fig. 6) which being secured at its central portion to the said shaft $S^5$ and bearing at its opposite extremities the small rollers $d'$ $d'$ is designed to shift the shaft $S^5$ in opposite directions through and by means of the small rollers contacting with the raisers $g^4$, $g^4$, &c. and intermediate depressions in the disk wheel G, when the said disk wheel is rotated, the manner of the said rotation to be hereinafter more particularly described. As before described, the sprocket wheel 30 rotating by means of a sprocket chain connection rotates the sprocket wheel 31 and with it the shaft $G^5$ upon which are keyed the segmental cog-wheels 32 and T (attention is called to the two segmental cog-wheels immediately below Fig. 7). The cog wheel 32 is designed to mesh with the cog wheels $f^{15}$ on the rearward ends of the castings $i$, $i$ &c. The segmental cog wheel T is designed to mesh with the segmental cog wheel $L^{31}$ which being keyed upon the shaft L rotates the same which in turn rotates the cam wheel $L^3$ and also the disk wheels $b$, $b''$ on the forward end of the said shaft. The machine in operation in the position shown in Fig. 7, the segmental cog-wheel T rotating to the left has traversed its cogs imparting a motion through the cog wheel $L^{31}$ and to the shaft L throwing the cam wheel $L^3$ into position shown in Fig. 8 which bears upward the lever $r$ and a roller on the end thereof, is engaged in the semi-circular depression in the plate $e^8$, to stay the carriage in position, and the same action of the said shaft L throws the arm $l'''$ into the position shown in the said figure which throws outward the short arms $l$, $l''$ and with them the short arms on the depending rods $j^4$, $j^5$ which are designed to draw a wire forward and also contacting with the fingers $j, j$ &c. throw them outward. The machine continuing its operation the segmental cog wheel 32 meshing with the cog wheel $f^{15}$ on the backward end of one of the castings $i$, which as before explained completes the journal bearing in connection with the frame work that carries the spool, rotates the same turning with it the frame work $k$, which carries the spool $d^4$, thus making the twist as shown in Fig. 14; one revolution of the segmental cog wheel 32 imparting two revolutions to the twisting device and when the cog wheel T has completed its rotation over its smooth surface and again engaging with its cogs, the cog wheel $L^{31}$ gives a half turn to the shaft L which in turn throws the cam wheel $L^3$ downward when the roller $t^9$ contacts with the arm $r^5$ of the lever $r$ depressing the said lever and releasing the roller $r'$ from its engagement with the semi-circular depression in the plate $e^8$ and also throwing the disk wheels $b, b''$ into the reverse position here shown and bringing the small roller $b'$ in contact with one of the fingers $g'$ thus imparting motion to the disk wheel G, and by means of the pins $w, w$ &c. on the disk wheel G engaging the cogs of the cog wheel $f^{25}$ imparting a slight motion to said cog wheel which in turn, turns the shaft $S^6$ which bears with it the square plate M which shifts the said plate from its position shown in Fig. 9 to the positions shown in dotted lines, in which position its lineal sides are parallel with the plate $x^2$ and the movement of the disk wheel G and the contact of the small roller on $S^9$ with the raised portion $g^4$, throws the piece $S^9$ from its position shown in Fig. 6 (in which position as there shown operates the levers of the friction clutch so as to engage the wheel $A^{12}$ so as to rotate the said shaft $S^{15}$ which operates the machine as hereinbefore described to form the twist) into the reverse position, that is, with the upper roller in an intermediate depression, in which said position the shaft $S^5$ is shifted with the piece $S^9$ and with it the levers $k^5$, $k^2$ so that the friction clutch which connects with the shaft $S^{15}$ is released from the wheel $A^{12}$ and the wheel $A^{12}$ is in turn engaged by the friction clutch connected with the shaft $S^2$. The shaft $S'$ being in rotation by its sprocket wheel connection $f^{45}$ with the chain $M^4$ rotates the wheel $A^{12}$ and by the action of the friction clutch just before described, the shaft $S^2$ is rotated and with it the cog wheel R, which said cog wheel R meshing with the plate of cogs $m$, bears the carriage forward until one of the depending fingers contacts with one of the pins $w^2$ when the square plate M (Fig. 9) is turned to engage the notch in the plate $x^2$ which slight turn also turns the cog wheel $f^{25}$ which contacting with one of the pins $w$, on disk wheel G, gives a slight turn to the disk wheel G and in this turn the piece $S^9$ is again shifted into the position as shown in Fig. 6 which in turn shifts the friction clutches so as to release the hollow shaft $S^2$ when the carriage immediately stops it, having traveled the space between one of the castings $i$ and the next succeeding casting and is stopped at such a point as to bring the half journals of the frame work $k$ which carries the spool $d$ so as to form a complete journal with the half journal immediately below in readiness for the twist. It will be understood that the wheels N, N &c. the castings $i$, $i$ &c. and the spools $d^{10}$, $d^{10}$ &c. align, and the said spools $d^{10}$ are designed to carry wires which bearing forward are carried through perforations in the castings $i$, $i$ &c. and upon the surfaces of the wheels N, N &c. which constitute the intermediate frame wires of the wire fabric. A continuous or crossing wire which is designed to be twisted upon the frame wires, is carried upon the spool $d^4$, and is carried forward through a perforation in the forward part of the half journal of the framework $k$ (as seen in Fig. 4). The frame portions D, D' carry the spools $d$, $d'$, $d^2$, $d^3$ which are purposed to carry wires which bear forward through perforations in the journal, one of which is designated by $k^2$, (as shown in Fig. 11); the wires continuing forward one on either side of the respective bars F, F' pass through openings in the castings $i^5$, $i^6$ and continuing on through the casting are finally carried upon the wheels N, N, and are twisted to form a cable upon which said cables is also twisted at intervals the continuous wire. The manner of turning the cables will be seen by reference to Fig. 1, where it will be understood that the cog wheel $f'$ meshing with a cog wheel on the end of a similar casting to $i^5$ and corresponding in relative adjustment with cog wheel $f$ and being rotated with the twister, twists the cable, and the sprocket wheel $f^3$, being fixed upon the same shaft operates the sprocket chain $M^3$ and the sprocket chain being connected with the sprocket wheel $x^9$ turns the same and with it the cog wheel $f^{10}$, they being on the same shaft and the said cog wheel $f^{10}$ meshing with the cog wheel $f^{20}$ rotates the same and in its rotation operates the sprocket wheel $f^{13}$ (best seen in Fig. 4$^a$) through and by means of a friction clutch to which the said sprocket wheel is fixed, the same being on a hollow shaft which incloses the shaft on which the cog wheel $f^{20}$ is fixed. This engagement of the friction wheel $A^{40}$ by the friction clutch to operate the sprocket wheel $f^{13}$ is accomplished through and by means of the lever $a^{16}$ being depressed which imparts downward movement to the depending rod $e'$ which operates the pivoted lever $e^{15}$ which in turn gives a backward movement to the rod $e$ upon the backward end of which is attached the short arm $e^{16}$ which operates the friction clutch and as before described when the friction wheel $A^{40}$ is so engaged the sprocket wheel $f^{13}$ is rotated and the same being connected with the sprocket wheel $M^5$ by means of the sprocket chain $N^9$, and in its rotation the casting $i^5$ is also rotated to make cable twist. The bars F, F' and the frames D, D' are turned with the operating twister to prevent the wires from being twisted. When the carriage is in the reverse position with the cog wheel $f'$ meshing with the cog wheel $f$, the operation is the same, only that the motion is conveyed the reverse from that in the position as shown in the figure. Of course it will be understood that when the continuous or crossing wire is being twisted upon the cable at the respective sides of the fabric, the friction wheel $A^{40}$ is released and only one of the cog wheels or frames D or D' as the case may be is operated in connection with the twister, formed by the combination of any one of the castings $i$ &c., or with casting $i$ having extensions $i^5$ with casting $k$ which carries spool $d^4$. After the carriage has traversed the width of the wire fabric and has performed the several twists uniting the continuous wires with the frame wires it is necessary that the frame wires be drawn out and wound off from their several spools the same being accomplished through and by means of the lever $a^{16}$, the same operating the rod $a'$ which has the short depending arm $v^5$ as shown in Fig. 6 to which is attached the rod $v^6$ carried in suitable boxes and being connected with the spring $a^5$, which rod $v^6$ is designed to shift lengthwise and having fixed thereto the arm $a^{10}$ (best shown in Fig. 4) depending to connect with the hollow shaft $S^{18}$ upon the shaft $E^2$ which shaft $E^2$ carries the combined friction and belt wheel $A^{22}$, the said hollow shaft being provided with a friction clutch designed to engage and release as desired the wheel $A^{22}$, the said hollow shaft has also fixed thereto the sprocket wheel $f^6$ which said sprocket wheel is connected with the sprocket wheel $K^4$. Upon the same shaft with the sprocket wheel $K^4$ is the sprocket wheel $K^5$, the same being connected with the sprocket wheel K, by means of a sprocket chain; and upon the same shaft 2, with the sprocket wheel K is fixed the cog wheel $K^3$ (as shown in Fig. 6) which meshes with the cog wheel $K^2$ the same being upon the end of the shaft S upon which said shaft are also fixed the sprocket wheels $M^{24}$, $M^{25}$ which carry the sprocket chains M', M'' which extend backward to the back part of the machine and are carried upon sprocket wheels one of which is designated by $M^{23}$, the upper strands of said sprocket chains being connected with the clamp $A^{72}$ which said clamp is designed to secure the wire fabric and draw it backward through the operation of the machine from its position in Fig. 2 to its position shown in Fig. 1. When it is desired to draw the wires from off the spools to provide the proper space for a mesh in the wire fabric, the lever $a^{16}$ is operated to engage the friction clutch on the hollow shaft $S^{18}$ (Fig. 4) with the wheel $A^{22}$ which said wheel $A^{22}$ being rotated through and by means of the belt $p$ gives a corresponding rotary motion to the sprocket wheel $f^6$ which is conveyed to the sprocket wheel $K^4$ by means of the sprocket chain connection which said rotary motion is thus conveyed to the sprocket wheel $K^5$ and again conveyed to the sprocket wheel K by means of a sprocket chain, the said sprocket wheel K being fixed upon the same shaft with the cog wheel $K^3$ rotates the shaft which imparts a rotary motion to the said cog wheel, the same meshing with the cog wheel $K^2$ turns the same and with it the shaft S which in turn rotates the sprocket wheels $M^{24}$, $M^{25}$ fixed thereon, thus operating the sprocket chains to which the clamp $A^{72}$ is attached which secures the wire fabric, thus completing the operation of drawing out the wires. When they have been drawn out a sufficient distance the lever $a^{16}$ is released and by action of the spring $a^5$ upon the shift rod $v^6$ the friction clutch is released from its engagement with the wheel $a^{22}$ and the operation of drawing out at once ceases. While the operation of drawing out is being performed there is a simultaneous movement of the roller $W^{26}$ upon which the wire fabric is rolled which said movement is conveyed to the roller through and by means of the arm H (Fig. 2) being pivoted at its forward end to the sprocket wheel $K^4$ at a point $b^6$ without its center to form an eccentric as shown in Fig. 5, the said arm H, being connected at its rear end with the spring lever $H^{18}$ pivoted at the top and made in two sections with one of the sections connected with the arm $H^{20}$ as at $h^{12}$ and carried upon the lug $H^{21}$ and provided with a perpendicular slot in its backward extremity through which the lever $b^5$ depends loosely, the said lever $b^5$ being pivoted as at $b^7$ and pivotally connected at its upper extremity with the arms $H^3$, $H^8$ which have corresponding arms (Fig. 1) on the opposite side of the ratchet wheel $H^2$, to which said arms are pivotally connected the arms $H^{10}$ which are journaled loosely upon the same shaft with the ratchet wheel $H^2$, there being corresponding arms on the opposite side of the ratchet wheel $H^2$ (one of which is shown) pivoted and journaled in the same manner as the arms $H^{10}$. Upon the pivotal connecting means are carried the pawls $H^6$, $H^7$ which are designed to engage the ratchets on the ratchet wheels $H^2$. Upon the same shaft with the ratchet wheels $H^2$ are the sprocket wheels $f^{30}$, $f^{33}$ which said sprocket wheels are connected with the sprocket wheels $f^{31}$, $f^{32}$ by means of sprocket chains, the said sprocket wheels $f^{31}$, $f^{32}$ being fixed upon the same shaft with the roller $W^{26}$ are designed to rotate the said roller. When the wire is being drawn out as before described and the sprocket wheel $K^4$ is being rotated, it will be seen that a backward and forward movement will be imparted to the arm H, since the said arm is pivoted to the said sprocket wheel to form the eccentric as shown in Fig. 5, the said backward and forward movement of the arm H is conveyed to the spring lever $H^{18}$ and thence to the arm $H^{20}$ which imparts a backward and forward movement to the depending lever $b^5$ which being pivoted as at $b^7$ imparts a corresponding backward and forward movement to the upper or short arm of the lever, thence to the arms $H^3$, $H^8$ and their corresponding arms which it will be seen will operate the ratchet wheel $H^2$ by means of the pawls $H^6$, $H^7$ engaging alternately with the ratchets, thus turning the wheels slightly by the engagement of the pawl $H^7$ in the forward movement of the levers $H^3$, $H^8$ while the pawl $H^6$ slips over one or more of the ratchets, and turning the wheel slightly and in the same direction by the engagement of the pawl $H^6$ in the backward movement of the said arms while the pawl $H^7$ slips over one or more of the ratchet teeth; the said pawls being held in position by means of suitable springs. The said rotary motion of the said ratchet wheel imparts motion to the sprocket wheels $f^{30}$, $f^{33}$ and thus to the sprocket wheels $f^{31}$, $f^{32}$ by means of the sprocket chain connection, which in turn conveys rotary motion to the roller $W^{26}$ upon which the wire fabric is rolled. It will be observed by reference to Fig. 2 that the roller $W^{26}$ or the wire fabric rolled thereon bears upon the roller $W^{26}$ which said roller is journaled in the frame piece $A^{53}$, on one side, and in a corresponding frame piece on the opposite side. It will also be observed by reference to Fig. 3 that the frame piece $A^{25}$ is pivoted to the frame piece $A^{53}$, at the point $b^{18}$ with the corresponding frame piece on the opposite side pivoted in the same manner; and in these said frame pieces $A^{25}$, the roller $W^{26}$ is journaled. The object of the said arms $A^{25}$ being so pivoted is to allow them to be borne upward by the gradual increase of the size of the roll of wire fabric and as the roll is increased in size and the frame pieces $A^{25}$ are borne upward the length of the long arm $b^5$ pivoted thereto is increased, in the sense, that it is drawn upward through the slot in the arm $H^{20}$, thus increasing the distance between its pivotal or fulcrum point attachment at $b^7$ and the lever $H^{20}$ so that as the arm $b^5$ of the lever is gradually lengthened a smaller degree of motion is given to the short arm of the said lever and as a result the arms $H^3$, $H^8$ through the pawls $H^7$, $H^6$ transmit a correspondingly smaller degree of motion or rotation to the ratchet wheel $H^2$ and to the sprocket wheels $f^{30}$, $f^{33}$ and finally to the roller $W^{26}$, thus equalizing the rotation of the roller to accommodate itself to its increase in size, as it will be readily seen is necessary.

By reference to Fig. 10 it will be seen that the rim of the spool which is there shown bears upon the friction block W; the object of the said friction block is to produce a regular and steady tension upon the wire which is designed to be wound upon the said spool and drawn therefrom as the machine is in operation there being the same tension when the spool is wound full as when it is nearly empty. This is evident as the winding off of the wire from the spool bearing upon the friction blocks acts on the principle of a lever. The varying arm of the lever being the radius of the spool and when the spool is wound full though the weight is greater upon the friction blocks it is equalized by the greater length of leverage; and when the spool is nearly empty though its weight upon the friction blocks is much less, yet it requires the same degree of tension or pull to turn the same, due to the shortness of the arm of the lever thus giving a uniform tension, regardless of the amount of wire upon the spools.

It will be seen that as before described the twist is designed to be made immediately in front of the castings $i, i, i$ &c. and at the point where the wires come out through the perforations in the said castings; and as the crossing wire is wound from the spool $a^4$ and passes through the perforation in the journal, it is carried over one of the short levers or a hook thereon on the rods $j^4$ $j^5$, and is drawn outward by the action of the said levers in the operation of the machine as herein before described providing sufficient space for the twist to be made as shown in Fig. 14; the fingers $j'$ are designed to retain the mesh in proper form and is pivoted as shown in the figure so that the wire fabric can be drawn over the said fingers which are returned to their original position by the action of the spring $j^2$ and similar springs attached to the several fingers.

Having thus fully described our invention, what we claim and desire to secure by Letters Patent is:

1. In a wire fabric machine, the combination with a series of sectional twisters for warp wires, adapted to be intermittently rotated, each independent section of the series alternately in an opposite direction and each having perforations in both journals of the respective sections for the passage through of wires, of a shifting section for the weft-wire adapted to have a lateral movement on its journals for successive matching relation with the journals of said series of sections and having a perforation in one of its journals for the passage through of a wire, whereby when the said shifting section and any one of the series of sectional twister journals are in conjunction and rotated together, the said wires will be twisted together, all substantially as described and set forth.

2. In a wire-fabric machine, the combination with a series of sectional twisters for warp wires adapted to be intermittently and successively rotated each independent section of the series alternately in an opposite direction, each having its journals flattened on one side to form one half of the complete journal, and each having perforations in both half journals of the respective sections for the passage through of wires, of a shifting section for the weft wire having corresponding flattened journals to form the other half of a complete journal and a perforation in one of the said half-journals for the passage through of a wire, shifting carriage having semi circular recess bearings for the half-journals of said shifting section and stationary bearing frame having semi-circular recess, bearings for the half-journals of each of the series of stationary sections and mechanism for reciprocating the shifting carriage to bring the journals of the shiftable section and of stationary sections, of the series in co-incidence successively for simultaneous rotation, both together to twist the wires together, all substantially as described and shown.

3. In a wire fabric machine, the combination, with a series of successively rotating sections for the warp wires, the rotation of each section being in an alternate direction in its successive rotation but in the same direction as the other sections of the series in their successive rotation, each having a semicircular depressed from between its half-journals and each having perforations in each of its respective half-journals, of a bifurcated section journaled above said series of sections and having a perforation in one of its half-journals for passage through of a wire, and a spool mounted in said section for carrying the weft-wire, said journaled parts when in co-incident relation constituting a twisting device, and actuating mechanism for shifting the shiftable carriage and section laterally to bring its half-journals in conjunction with the half-journals of each of the series of sections in succession and to rotate the said combined sections together and each independent section of the series alternately in opposite directions but always in the same direction as the alternate rotation of each of the respective sections of the series to twist the wires together, all substantially as described and shown.

4. In a wire fence machine, the combination, with a series of successively rotating sections each having perforations in their half-journals for the warp-wires, the rotation of each independent section of the series being alternately in opposite direction but always the same direction as the alternate rotation of each of the respective sections of the series, of a shiftable section having perforations in one of its half-journals for the weft-wire actuating mechanism for shifting said shiftable section with a carriage in which it is carried to bring its half-journals in matching relation with the half-journals of the series of sections successively and to rotate said combined sections, the shiftable section with each one of the series successively to twist the wires together, a clamp formed of two sections arranged one above the other and designed to bear over and engage the wire fabric for the purpose of drawing backward the said fabric by the application of suitable power and a fabric roll in advance of the clamp, all substantially as described and shown.

5. In a wire fabric machine, the combination, with a series of successively rotating sections, having perforations in their respective half-journals for the warp-wires, the rotation of each independent section of the series being alternately in opposite direction but always in the same direction as the alternate rotation of each of the respective sections of the series, a shiftable section, having a perforation in one of its half-journals for the weft-wire, and actuating mechanism for shifting said shiftable sections with a carriage in which it is carried to bring its half-journals in matching relation with the half-journals of the series of sections successively and to rotate said combined sections, the shiftable section with each one of the series successively to twist the wires together, of a clamp formed of two sections arranged one above the other and designed to bear over and engage the wire fabric for the purpose of drawing the same backward by the application of suitable power, a series of wide-faced wheels over which the warp-wires are carried situated in advance of the perforated half-journals of the series of sections for spacing the warp-wire, all substantially as described and shown.

6. In a wire-fabric machine, the combination, with a series of successively rotating sections, having perforations in each of their respective half-journals, for the carrying through of the warp wires, the rotation of each independent section of the series being alternately in opposite direction but always in the same direction as the alternate rotation as each of the respective sections of the series, a shiftable section having a perforation in one of its half-journals for the weft-wire and actuating mechanism for shifting said shiftable section with a carriage in which it is carried to bring its half-journals in matching relation with the half-journals of the series of sections successively and to rotate the said combined sections, the shiftable sections with each one of the series successively to twist the wires together, of a clamp formed of two sections arranged one above the other and designed to bear over and engage the wire fabric for the purpose of drawing the same backward by the application of suitable power, a series of wide-faced wheels over which the warp-wires are carried situated in advance of the perforated half-journals of the series of sections and provided to properly space the said warp-wires and a take up reel for operation in way described, all substantially as described and shown.

7. In a wire fence machine, the combination, with a series of successively rotating sections having perforations in each of their shiftable half-journals for the carrying through of the warp-wires the rotation of each independent section of the series being alternately in opposite direction but always in the same direction as the alternate rotation as each of the respective sections of the series, of the shiftable section, having a perforation in one of its half-journals for the weft-wire and actuating mechanism for shifting said shiftable section with a carriage in which it is carried to bring its half-journals in matching relation with the half-journals of the series of sections successively and to rotate the said combined sections, the shiftable sections with each one of the series successively to twist the wires together, of a clamp formed of two sections arranged one above the other, and designed to bear over and engage the wire fabric for the purpose of drawing the same backward by the application of suitable power, a series of wide-faced wheels over which the warp wires are carried situated in advance of the perforated half-journals of the series of sections and provided to properly space the said warp-wires, a take-up reel for operation in way described and a series of pivoted fingers arranged in pairs and adjusted immediately in front of the series of sections and in such position that the warp-wires are carried between the fingers of the respective pairs and are provided to engage with the wire meshes formed in the fabric to keep the same in proper form, the said fabric being enabled to be drawn over the said fingers when the wires are being drawn out, thus depressing the fingers which are returned to proper position by means of suitable springs provided for the purpose, all substantially as described and shown.

8. In a wire fabric machine, the combination, with the series of sections for carrying the warp-wires and a shiftable section for carrying the weft-wire, of the pinions on each of the series of sections, the same being segmentally toothed and the remainder of the surface thereof being depressed in circular form, and a segmentally toothed cog-wheel a portion of its circumferential face being smooth and provided to engage said pinions successively, a sliding frame in which the shiftable section and suitable mechanism for shifting said carriage and shiftable section frame one section of the series to the other in succession alternately traveling over every section of the series and returning, all substantially as described and shown.

9. In a wire fence machine, the combination of the main frame, movable carriage, wire twisting device comprising the series of twister sections and the shiftable section in the carriage, the shiftable section designed to intersect with each one of the series of sectional twisters in succession, the wire spools mounted upon the main framework at the rear of the twister sections, the frames, spools, and bar connections between the spool frames and sprocket wheels on ends of side sectional twisters for carrying the wires designed to form the side cables of the fabric, mechanism for revolving the twisting device, mechanism for drawing strands of wire from the spools, mechanism for rolling up the wire fabric, and mechanism for moving the carriage, all substantially as described and set forth.

10. In a wire fence machine, the combination of the main frame, of the bearing frame formed with segmental openings, the series of twister sections mounted therein, the movable crrriage, the shiftable twister section carrying a spool for the weft wire moved by the carriage and designed to be carried over and to be revolved with each one of the series of twister sections in succession to form the several twists, the spool, spool frames, and bar connections with sprocket wheels on the ends of side sectional twisters for carrying wires to be used in forming cable at the sides of the fabric, the intermediate spools mounted upon the main framework at the rear of the sectional twisters for carrying the remainder of the warp wires, mechanism for drawing the wires from off the spools, mechanism for operating the twister, mechanism for moving the carriage, and mechanism for rolling up the wire fabric, all substantially as described and set forth.

11. In a wire fabric machine, the combination with the series of sections for carrying the warp-wires arranged in parallel relation having perforated journals connecting with semi-circularly depressed central body and stationary carrying frame, having semi-circular bearings for said journals, of a shiftable section for carrying the weft-wire, a frame work or movable carriage having semi-circular bearings for the journals of said shiftable section adapted to move along upon the stationary carrying frame to bring the shiftable section or the journal thereof successively in conjunction with the journals of the respective sections of the series, means for rotating the combined section viz: the shiftable section with each one of the series successively in its movement back and forth with the sliding carriage as it traverses from one side to the other of the fabric in forming the twist, the said rotation of combined sections in the passage of the shiftable section with the carriage in one continued direction being the same and in the opposite movement of the shiftable section with the carriage, the direction of rotation is the same throughout, but the reverse for that in the opposite movement of the shiftable section and carriage, and means for shifting the said carriage and shiftable section in a step-by-step manner, all substantially as described and set forth.

12. In a wire fabric machine, a twisting device for carrying the warp and the weft-wires, consisting of a series of parallel adjusted and successively rotative sections supplemented by a shiftable section rotative successively with each section of the series, a clamp formed of two sections, adjusted one above the other to engage the wire fabric and to draw the same backward when suitable power is applied, a take-up reel for operation in manner described and mechanism for operating the combined sections to rotate them relatively in the same direction, consisting of a pinion on each section of the series segmentally cogged and having the uncogged portion depressed in circular form, a larger cog-wheel segmentally cogged and the uncogged portion of its circumference provided with smooth face for an engagement with the circular depression in the segmentally cogged pinion whereby each pinion is rotated a fixed portion of a revolution of said segmentally cogged larger wheel and held non-rotative the remainder of each revolution, all substantially as described and shown.

13. In a wire fence machine, the combination, with the main frame, of the carriage formed with the central oppositely and alternately rotatable shaft $S'$ journaled therein and bearing the disk wheel G loose thereon, the sprocket wheels $f^{45}$, $f^{30}$, the cog wheel R, the shiftable hollow shafts $S^2$ and $S^{15}$ that bear the friction clutches and the friction clutch wheel $A^{12}$ keyed thereon; the oppositely alternately shiftable shaft $S^5$, having secured thereto the arms $S^9$, the sprocket wheel $f^{46}$ loose thereon and the pivoted arms $k^2$, $k^5$ that operate the friction clutches; the rotatable shaft L bearing keyed thereon the partially cogged wheel $L^{31}$, the cam $L^3$, and the disk wheels $b$ and $b''$ carrying between them the small roller $b'$ and loose thereon the sprocket wheel $f$; the plate $R^5$ carrying the adjustable finger rods $j^4$—$j^5$ connected with the disk wheel $b$ and operated in connection therewith through the connecting arm $l'''$ and the levers $l$, $l''''$, and $l''$; the shaft $G^5$ bearing the sprocket wheel $f^{31}$, the cog wheel $f'$, and the partially cogged wheel $f^{32}$, that meshes successively with each one in succession of the partially cogged wheels on the ends of the sectional twisters, the partially cogged wheel T that meshes with the partially cogged wheel $L^{31}$ to give an intermittent motion; the twister section $k$ formed with half journals and carrying spool $d^4$; suitable mechanism for moving the carriage back and forth upon and across the main frame upon suitable bearings, and suitable mechanism for operating the working parts of the carriage, all substantially as described and set forth.

14. In a wire fence machine, the combination with the main frame, of a wire reel formed of the roller $W^{26}$ bearing upon the roller $W^3$ and journaled in the pivoted frame pieces $A^{25}$, the ratchet wheel $H^2$ fixed upon the shaft $S^{12}$ and turned by means of the pawls $H^7$ and $H^8$ actuated through the movement of the pivoted arms $H^{10}$ and $H^3$ imparted thereto by the back and forth movement of the depending pivoted arm $b^5$; suitable sprocket wheel and sprocket chain connection between the roller shaft and the ratchet wheel shaft, and suitable means for imparting the back and forth movement to the arm $b^5$, all substantially and for the purpose set forth.

15. In a wire-fabric machine, the combination with the series of spools $d^{10}$—$d^{10}$—$d^{10}$ &c. having the rims as shown and designed to be filled with wire, of the friction blocks W, depressed circularly to fit the rims on the said spools $d^{10}$ and said spools being held in suitable standards to prevent side motion, the combined structure being formed to provide and produce a regular and unvarying tension upon the wire on said spools while same is being wound thereon, all as particularly described and shown.

16. In a wire fence machine, the combination therewith, of a wire reel formed of the roller journaled in arms pivoted to permit its being raised or lowered and bearing upon another roller suitably journaled, the ratchet wheel keyed upon the shaft connected by suitable means with the reel roller shaft, the combination of pivoted arms journaled upon the same shaft with the ratchet wheel and bearing at their middle pivoted joints the oppositely actuating pawls, and all the arms pivoted together at their rear extremities to a depending bar, the depending bar pivoted at a point between its extremities and depending downward through the slot in the adjustable arm below, and suitable mechanism for operating the depending pivoted lever for the purpose of imparting motion to the respective parts to turn the reel, all substantially as described and shown.

17. In a wire fabric machine, a twisting mechanism composed of a series of warp-wire carrying sections successively rotated each in the same direction and having a fixed relation to the stationary carrying frame and a shiftable section designed to be successively matched and rotated with each of the respective sections of the series and rotated with said sections to twist the wires together and a series of pivoted fingers arranged in pairs immediately in front of the respective sections of the series to hold the wires in alignment and to hold the mesh of the fabric in form while the twist is being made and a clamp designed to engage the wire fabric and by the application of suitable power to draw the same backward to draw out the wires from off the spools and through the respective sections of the series, all substantially as described and shown.

18. In a wire fence machine, the combination therewith of the clamp $A^{72}$ designed to be secured to the wire fabric at the forward part of the machine and having connected therewith the sprocket chains $M'$ and $M''$ carried upon suitable sprocket wheels at the forward and rear ends of the machine, provided for the purpose of drawing out the wires from off the spools; the roller $W^{26}$ journaled in the pivoted frame pieces $A^{25}$ and carried upon the roller $W^3$, the ratchet wheel $H^2$ fixed upon the shaft $S^{12}$ and turned by means of the pawls $H^7$ and $H^8$ actuated through the movement of the pivoted arms $H^{10}$ and $H^3$ imparted thereto by the back and forth movement of the depending pivoted arm $b^5$, suitable sprocket wheel and sprocket chain connection between the roller shaft and the ratchet wheel shaft, suitable mechanism for moving the clamp $A^{72}$ for the purpose of drawing out the wires, and suitable mechanism for imparting a back and forth movement to the arm $b^5$ for the purpose of operating the wire reel for rolling up the wire upon the roller $W^{26}$ as the wire fabric is drawn backward by the clamp $A^{72}$, all substantially as described and set forth.

19. In a wire fabric machine, the combination, with a series of warp wire carrying sections constructed to be successively rotated, each in constant direction and having a fixed relation to the stationary carrying frame and a shiftable section for carrying the weft-wire, constructed and arranged to be successively moved or shifted and matched and rotated by and with the independent sections of the series successively for the purpose of twisting wires together, of a series of pivoted fingers arranged in pairs immediately in front of the respective section, of the series to hold the warp wires in alignment and to hold the mesh of the fabric in form while the twist is being made, the clamp formed of two sections designed to engage the wire fabric and by the application of suitable power to draw the same backward to draw out the wire from off the spools and through the respective sections of the series, a series of wide-faced wheels adjusted at intervals apart for carrying the wire-fabric and to assist the turning of its direction of movement and take-up reel for operation in the way described, all substantially as described and shown.

20. In a wire fabric machine, the combination, of a series of parallel adjusted sections for warp-wires, having a fixed relation to the frame, each having a wire delivery passage in each of its respective half-journals and a broken or segmental pinion on one end of each of the respective sections, with a shiftable section for the weft wire, shiftable laterally successively from section to section in a step-by-step motion in a plane above said series of sections, a gear connected shaft carried in the same carriage or shiftable frame with the shiftable section and having a segmental gear wheel adjusted to engage successively with each section pinion to effect the rotation of said combined sections the said shifting section successively with each section of the series, each section in the same direction according to the direction of the lateral movement of the shifting-section, mechanism for shifting the said shiftable section and frame also suitable mechanism for rotating the sections when in conjunction to form the several successive twists and means for drawing out the wires, all substantially as described and set forth.

In testimony whereof we affix our signatures in presence of two witnesses.

PETER SOMMER.
JOHN SOMMER.
PETER W. SOMMER.

Witnesses:
BENJAMIN F. SOMMER,
A. D. DAVIS.